June 24, 1952  H. P. BAUMANN  2,601,426
PROTECTIVE DEVICE
Filed Sept. 11, 1947
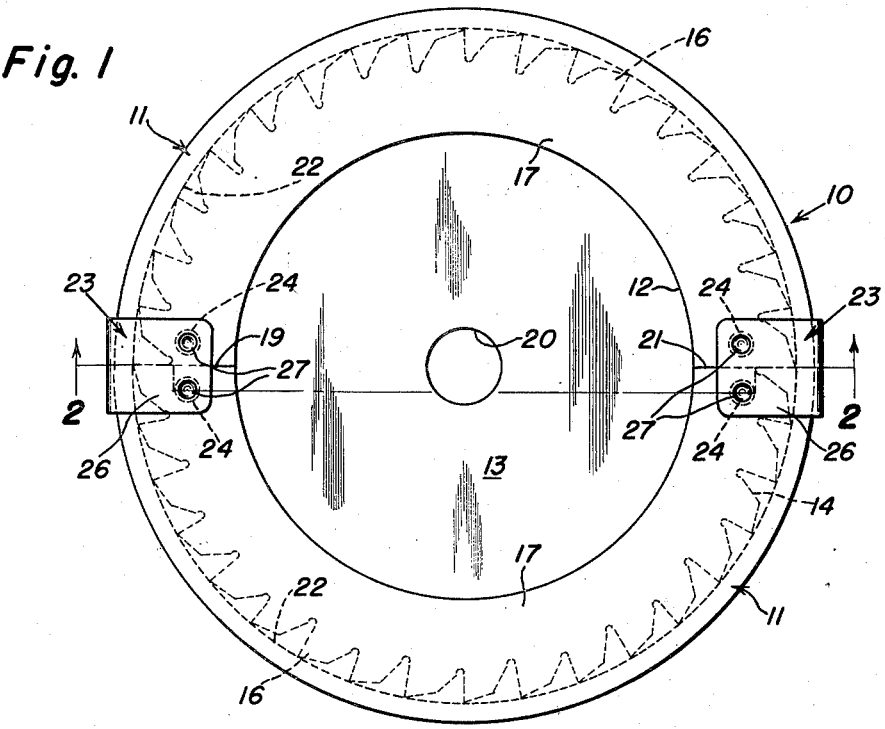
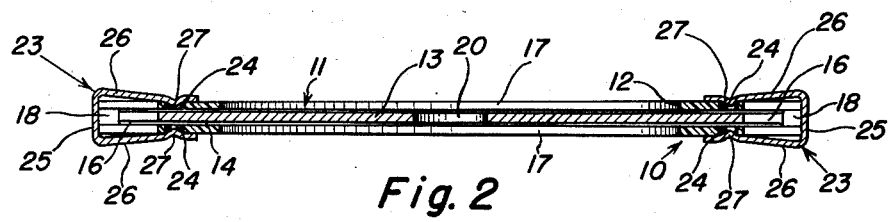
INVENTOR.
Harry P. Baumann
BY
Strauch & Hoffman
Attorneys

UNITED STATES PATENT OFFICE 2,601,426

PROTECTIVE DEVICE

Harry P. Baumann, Milwaukee, Wis.

Application September 11, 1947, Serial No. 773,390

7 Claims. (Cl. 206—16)

The present invention relates to protective devices for carbide tipped tools and more particularly to a protector for a carbide tipped cutting tool such as a circular saw or the like.

Carbide tipped tools, particularly saw blades and circular saws having a multiplicity of carbide tipped teeth are easily subject to damage in packing, shipping, storage and even in mounting and removing them for resharpening due to the brittleness of the carbide tips which may be broken or knocked off merely by striking the tipped teeth against the edge or surface of any solid substance such as wood, metal or the like. Since such tools often cost from one hundred and fifty to several hundred dollars and in many instances are refused by a purchaser because of damage apparent upon unpacking the tool or after it is mounted for use, a suitable protector for shipment and handling of the tool in mounting it in operative position is extremely desirable from the standpoint of the manufacturer. Furthermore, since the operation of mounting the tool and removing and remounting the tool for resharpening is the responsibility of the purchaser or user, a suitable protector to prevent damage under these latter circumstances is also desired by purchasers and users of such tools.

Accordingly the primary object of the present invention resides in the provision of a protective device capable of guarding a carbide tool against damage by striking against a solid substance.

Another important object of the present invention resides in the provision of a protective device that not only protects the tool during packing, shipping and unpacking of the tool but will also protect the tool while it is being assembled in place for use, removed and transported for sharpening and stored between periods of use.

Another object of this invention resides in providing a carbide tool protective device which is itself rigid but provides an internal cushion to absorb any relative movement between the tool and the protective device.

Still another object of the present invention resides in the provision of a separable protector which may be readily assembled with respect to a tool, particularly when the tool is in place for use.

Another object of this invention is to provide a separable carbide tool protective device with positive holding but readily and easily removable securing means.

Still other objects will appear from the following description and appended claims when read in conjunction with the attached drawing wherein:

Figure 1 is a plan view of a protective device constructed in accordance with the present invention and applied to a circular saw blade;

Figure 2 is a transverse sectional view taken on line 2—2 of Figure 1;

Figure 3 is a fragmental plan view of a modified form of the present invention; and Figure 4 is a fragmental end view of Figure 3 as seen from the left of Figure 3.

With continued reference to the drawing wherein like reference numerals are employed to indicate the same elements throughout the several figures, the present invention is illustrated in connection with a circular saw blade. The invention is of particular importance with such blades because of their greater weight, the difficulty of packaging them for shipment and the greater likelihood of injury when mounting the blade on its arbor under the work supporting table and in the saw receiving slot.

As shown in Figures 1 and 2, the protective device 10 comprises a pair of mating semicircular sections 11 providing a central annular opening 12 exposing the central body portion 13 of blade 14. As clearly seen in Figures 1 and 2, the arbor receiving opening of blade 14 is fully exposed while the carbide tipped teeth 16 and a substantial portion of the blade inwardly of teeth 16 is covered on both sides by the protective covering of the semicircular segments or side members 17 of the protective device 10. As a consequence, the blade may be readily mounted completely on its arbor without interference from the protective device since the arbor opening 20 and the surrounding saw body against which the customary stiffening collars, mounting inserts and the like rest is wholly exposed.

The side members or segments 17 throughout a substantial area of their adjacent outer marginal edges contact the opposite faces of a semicircular ring segment 18 which is permanently secured to members 17 by any suitable means such as cement, fusion contact or the like. The adjacent ends of semicircular members 17 and semicircular ring segments 18 abut one another along the lines 19 and 21. The inner peripheral edges 22 of semicircular ring segments 18 preferably closely engage the tips of teeth 16 as clearly seen in Figure 1 to prevent relative transverse movement between the protective device 10 and blade 14 and the thickness of ring segments 18 is preferably equal to or only slightly greater than the thickness of blade 14 so that blade 14 will be snugly held within the protective device 10.

While any suitable means may be employed to retain sections 11 in assembled relation, the preferred embodiment of the invention disclosed in Figures 1 and 2 contemplates the use of spring clips 23 preferably formed of spring steel. To this end, each of members 17 adjacent their abutting ends are provided with circular apertures 24, the apertures in each of the superposed members 17 being axially aligned. Clips 23 as clearly seen in Figure 2 are substantially U-shaped, and the connecting bridges 25 are substantially longer than the overall thickness of the sections 11 and interposed ring 18. The opposed legs 26 of clips 23 converge toward each other from their juncture with bridge 25 to their free ends which normally are spaced from each other a distance substantially less than the thickness of section 11 and are provided with semispherical protuberances 27 adapted to fit within apertures 24 as shown in Figure 2. Since legs 26 converge toward their free ends and are formed of spring steel, considerable pressure is exerted on members 17 and, due to the semispherical shape of depressions 27 cooperating with apertures 24, the ends of members 27 are tightly drawn into abutting relation. The gripping effect of clips 23 is in fact so strong that a screw driver or some similar tool is required to remove the clips. As a consequence accidental displacement of clips 23 is highly improbable and relative light wrapping paper or the like may readily be employed in shipping with an incident saving in packing costs.

While any suitable material may be used in the production of members 17, it is preferable to utilize a suitable transparent material so the condition of the carbide tips and the type of tooth may be readily determined without removal of the protective device. This is particularly desirable where the protective device is used for protection during storage and several blades having different tooth formations for different types of work are provided in a shop or tool room. A suitable material for members 17 which has been successfully used is the transparent plastic obtainable on the open market under the name "Lucite." This plastic like many other similar plastics which might be used are particularly suitable due to the facility with which they may be molded to the desired shape and the non-breakable characteristics.

While ring 18 may also be formed of "Lucite" or a like plastic, since such materials are sufficiently soft to provide slight penetration of teeth 16 without damaging them and because such rings may be integrally molded on one of the members 17, if desired, it has been found desirable, particularly in large size blades of substantial weight, to form rings 18 of leather, sponge rubber or some such readily deformable material.

It will also be appreciated that the protective device of this invention is so designed that the saw blades may be readily stored on pegs or the like provided on a wall of the tool room by insertion of the pegs through opening 20.

A modified form of protective device 18a is disclosed in Figures 3 and 4. In this form of the present invention, plastic members 17a are substantially identical to members 17 the sole difference being that the apertures 24 are omitted and rings 18a at one end are provided with extension tabs 35 and the opposite ends stop short of the abutting ends of members 17a to provide a pocket 36 (Figure 4) to receive tabs 35. In this form of the invention, clips 23 are replaced by a securing wire 37 which is threaded through aligned openings 38 formed in tabs 35 and the overlapping portions of members 17a. Securing wires 37 are secured in place by twisting their ends together as shown at 39 and, if desired, may have a seal 40 placed at their ends by an inspector at the manufacturing plant to certify to the proper conditions of the blade at the time of shipment. In lieu of tabs 35, pockets 36 and openings 38, the marginal edge of sections 17a adjacent their abutting ends may be provided with through openings to receive securing wire 37 or other fastening element forming a part of an inspection seal.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A protective casing for a circular saw blade comprising two pairs of rigid semicircular members, two members of each pair being disposed in overlying relation and formed to cover the opposite faces of the saw teeth and an adjacent portion of the saw body, spacing ring segments disposed between said pairs of overlying semicircular members along their outer marginal opposed faces and adapted to lightly engage the peripheral tips of the teeth of an encased saw blade, and means adjacent the ends of each of said semicircular members to hold them in assembled relationship.

2. The combination defined in claim 1 wherein said spacing ring segments at one end are provided with a tab extending beyond the adjacent ends of said semicircular members and at the opposite end stops short of the adjacent ends of said semicircular members to provide a pocket to receive the adjacent tab of a mating casing.

3. The combination defined in claim 2 wherein said tab is provided with a through opening and the semicircular members at their ends remote from said tab are provided with aligned through openings, said openings being provided to receive a securing wire to fasten a pair of mating casings together and form a circular protective casing.

4. A protective and shipping casing for a circular saw blade, comprising a pair of mating semicircular casing sections adapted to be secured together with their ends in abutting relation, each casing section comprising a central semicircular ring segment of deformable material and outer semicircular ring segments on either side of the central segment, all of the segments in each section being rigidly secured together and the inner diameter of the central segment being larger than the inner diameters of the outer segments, whereby the pair of casing sections when assembled in abutting relationship provide an inner annular groove for the reception of the toothed periphery of a saw blade; means adjacent the abutting ends of the casings to receive a securing element; and a securing element cooperating with said last mentioned means to secure said casing sections together.

5. The combination defined in claim 4 wherein the abutting ends of said semicircular casing sections are respectively provided with a tab extending beyond said abutting edges and a pocket to receive said tab and said means to receive a portion of a securing element comprises aligned openings in said tab and the portions of said casing sections defining said pockets adapting said casing sections to receive a securing element in the form of a securing wire.

6. The combination defined in claim 4 wherein said semicircular casing sections adjacent their abutting ends are respectively provided with through openings and said securing element comprises a U-shaped spring clip having opposed inwardly facing protuberances formed on its legs and adapted to enter the opposite ends of said through openings.

7. A protective casing for a circular saw blade comprising a pair of mating, semicircular, rigid casing sections having inwardly open radially extending semicircular recesses adapted to receive the teeth and at least a portion of the body of one half of the blade; the casing sections having their adjacent ends in abutting relation and having means forming indentations in their outer surfaces near their abutting ends; and means for securing said casing sections together comprising spring clips adapted to engage opposite faces of said casing sections adjacent their abutting ends and having protuberances operable to seat in said indentations and draw the abutting ends of said casing sections together so as to clamp a saw within the protective casing and retain said casing sections in assembled relation.

HARRY P. BAUMANN.

REFERENCES CITED

The following references are of record in the file of this patent:

UNITED STATES PATENTS

| Number | Name | Date |
|---|---|---|
| D. 90,245 | Haan | July 4, 1933 |
| 102,923 | Disston | May 10, 1870 |
| 716,785 | Taylor | Dec. 23, 1902 |
| 757,740 | Happe | Apr. 19, 1904 |
| 925,244 | Stevenson | June 15, 1909 |
| 1,205,246 | Mowry | Nov. 21, 1916 |
| 1,257,541 | Sillcocks | Feb. 21, 1918 |
| 2,291,219 | Fontecilla | July 28, 1942 |
| 2,344,919 | Kelly | Mar. 21, 1944 |